Sept. 2, 1930.  C. H. LAND  1,774,894
TRACTOR TRAILER
Filed Jan. 19, 1929  4 Sheets-Sheet 1
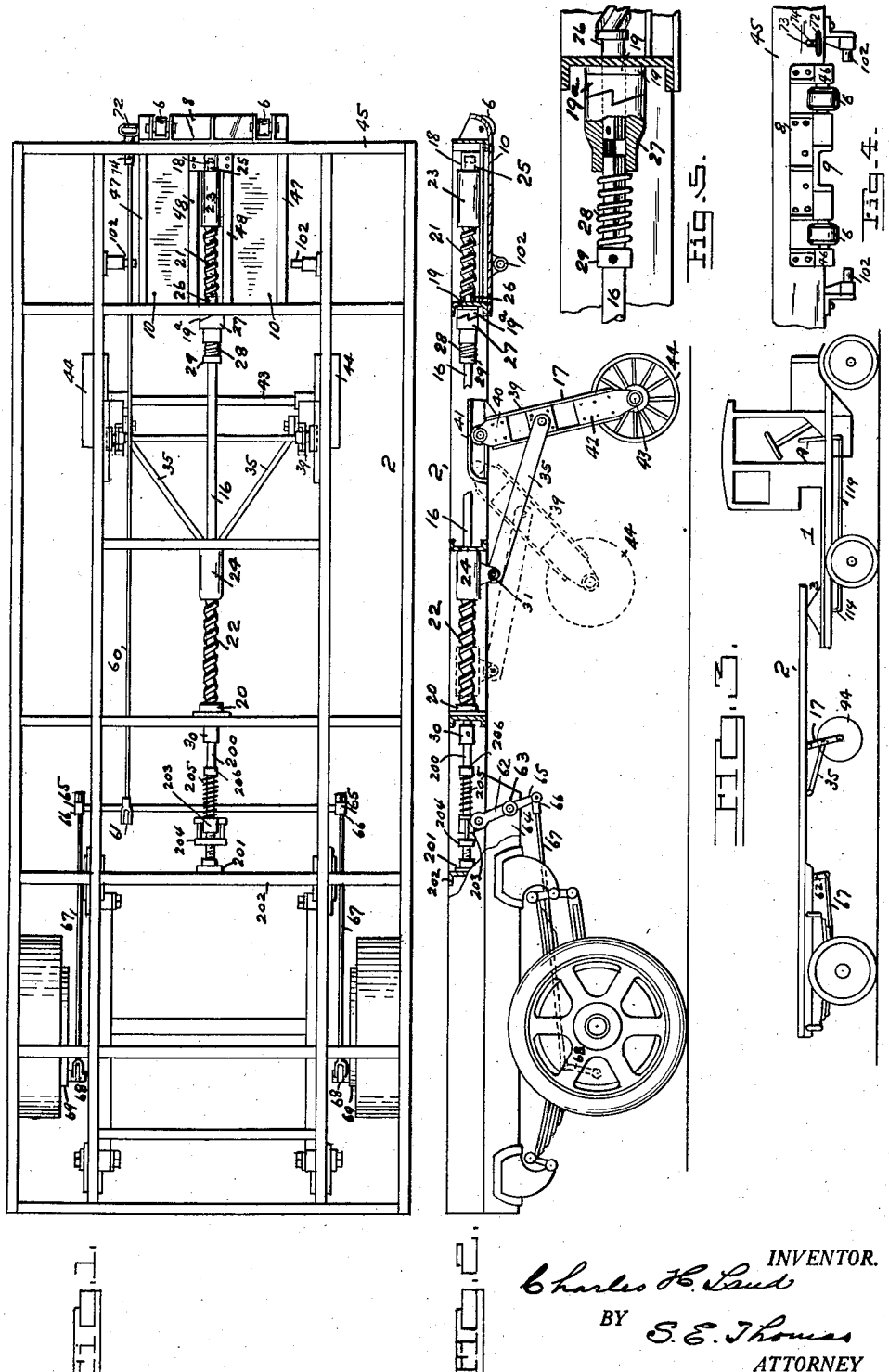
INVENTOR.
Charles H. Land
BY S. E. Thomas
ATTORNEY Sept. 2, 1930.  C. H. LAND  1,774,894
TRACTOR TRAILER
Filed Jan. 19, 1929    4 Sheets-Sheet 2

INVENTOR.
Charles H. Land
BY S. E. Thomas
ATTORNEY

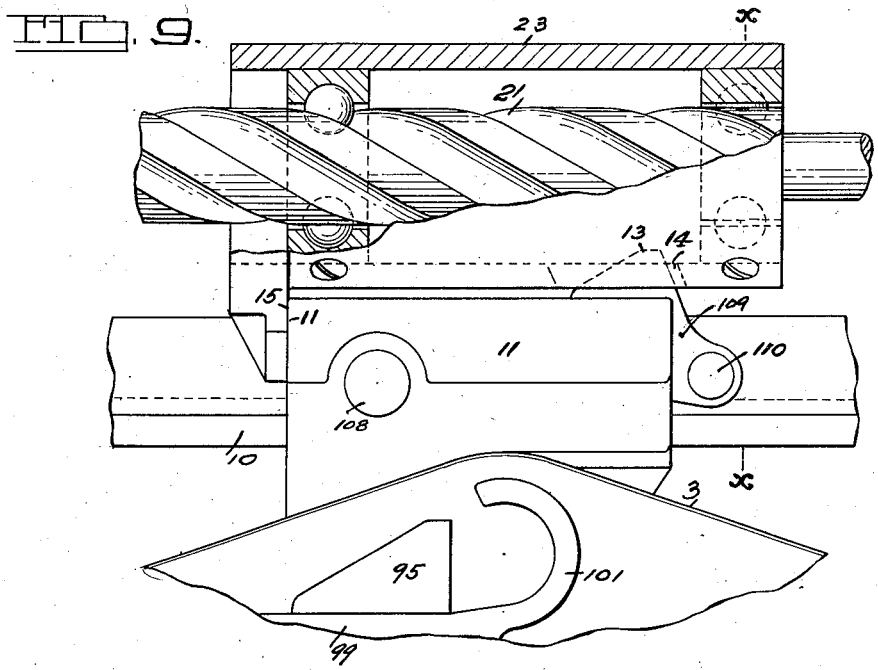
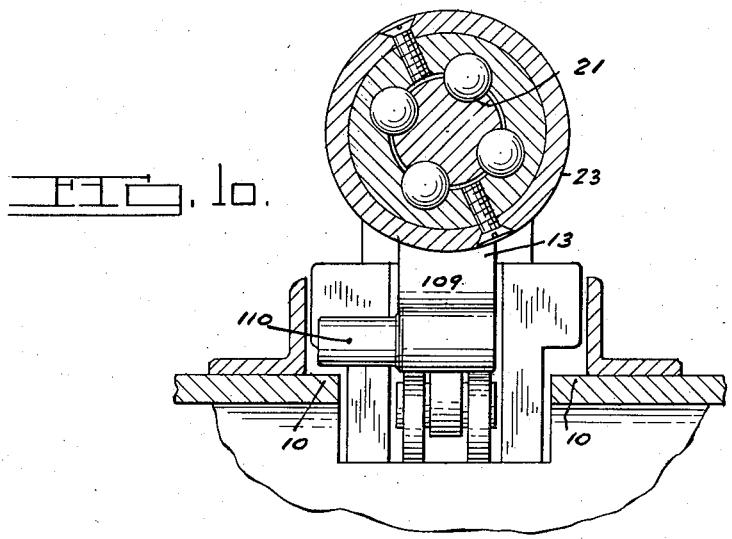

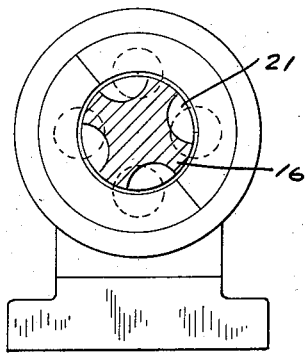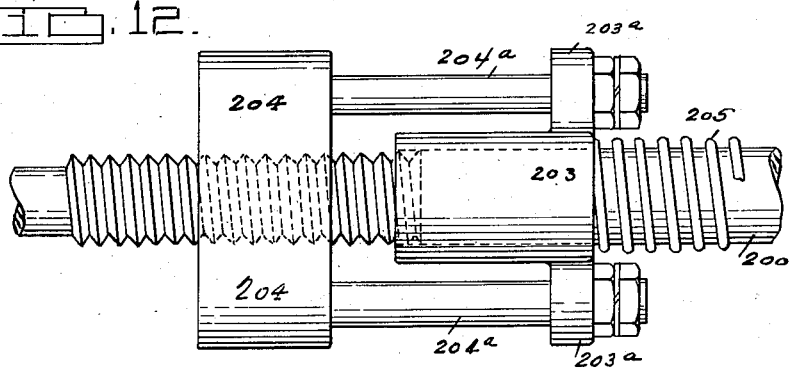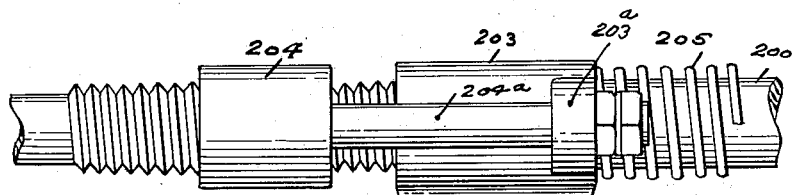

Patented Sept. 2, 1930

1,774,894

UNITED STATES PATENT OFFICE

CHARLES H. LAND, OF DETROIT, MICHIGAN

TRACTOR-TRAILER

Application filed January 19, 1929. Serial No. 333,694.

This invention relates to a tractor-trailer combination of the detachably connected type and in many respects may be considered a modification of the invention shown and described in my application for patent for tractor-trailers filed October 17, 1928, Serial No. 312,992.

The trailer in the present instance has the usual rear axle assembly with brakes which are spring set, and manually released when detached from the tractor as described in my former application. These brakes (manually operated) are only used for coupling and uncoupling the tractor and trailer;—automatic means being provided to release the brakes upon coupling the tractor to the trailer.

The trailer is provided near its forward end with a swinging supporting leg respectively raised and lowered by the reciprocating motion of the tractor;—raised when effecting a coupling relation with the trailer and lowered upon uncoupling therefrom.

The forward end of the trailer is provided with elevating wheels, a rocking plate, coupling pins, and travelling means,—fitted with balls to provide a rolling driving connection between the travelling means and a helix on a divided longitudinal shaft for actuating the swinging leg mechanism. This constitutes the upper element of a fifth wheel and is carried by the trailer;—the lower element of the fifth wheel being attached to the tractor.

The divided longitudinal shaft is coupled together through a clutch mechanism, whereby the supporting leg mechanism, including a second travelling means, also fitted with balls to provide for a rolling driving contact, is actuated by a second helix on the longitudinal shaft that it may raise or lower the swinging supporting leg carried by the trailer and connected with said second travelling means.

In the present invention the lower fifth wheel is provided with skids to receive the elevating wheels carried by the trailer so that the trailer may be raised to a coupling position by the backward movement of the tractor. The lower fifth wheel is also equipped with a turn-table, draft mechanism, a locking member, a lock for the driving head member and locks to hold the tractor and trailer together for transit;—means (not shown) being provided to release the locks from the cab through the operation of a single lever.

The present device is also provided with a guide on one of the inclined faces of the fifth wheel member to insure the necessary alignment for coupling;—also a spring actuated clutch on the divided rotatable shaft, whereby the shaft is not permitted to turn until the coupling of the trailer and tractor has been effected. These several features having been shown and described in a co-pending application, previously referred to, it will be unnecessary therefore to again enter into a detailed description and showing of the same in the present application, except in so far as may be necessary to describe and illustrate the present invention.

The primary object of the present invention is to provide a rolling driving contact between a divided longitudinal helical shaft and a pair of travelling heads through a plurality of balls located between the respective driving and driven travelling heads and the divided longitudinal helical shaft whereby the point of contact between the balls of the driving head and the forward section of the divided longitudinal helical shaft, and the balls of the driven travelling head and the rear section of said helical shaft will move in the grooves of the shaft without sliding, by perpetually turning over the foremost point of contact, thereby reducing wear and differentiating from the driving rotator head and the driven head carried by the divided longitudinal helical shaft of my pending application, wherein the driving rotator head and the driven head moves bodily over the surface of the divided helical shaft without ceasing to touch it and therefore the same surfaces remain always in contact.

In the present invention a divided, longitudinal, helical shaft,—adapted to be clutched together to operate a swinging leg for supporting the forward end of a trailer is actuated through a travelling rotator head,—fitted with driving balls lodged in a plurality of pockets to provide a driving connection between the head and the helical portion of the shaft;—said rotator head being reciprocated by the tractor when backing the tractor into the trailer to couple the trailer to the tractor and when driving in a forward direction to release the tractor from its coupled relation with the trailer.

A further object of the invention is to provide means for automatically releasing the previously set spring brake mechanism of the trailer through the rotation of the longitudinal helical shaft actuated by the tractor when backed into the trailer to effect a coupling relation between the tractor and trailer.

A further object of the invention is to provide means whereby the supporting leg may extend as far as possible toward the front end of the trailer in order that it may sustain heavy loads without tilting upwardly the rear of trailer, and still not interfere with the tractor wheels when coupling or making angular turns. In order to provide for this the helix at the forward end of the divided longitudinal shaft is formed with grooves of a lower pitch than the helix controlling the operation of the swinging leg,—at the rear end of the divided longitudinal shaft,—thus a relatively short movement of the tractor quickly drives the supporting leg rearwardly and upwardly for transit or returns it to its former supporting position.

The importance of locating the supporting leg near the forward end to carry heavy loads, with provision for quickly raising and shifting the leg rearwardly out of the way of the tractor wheels when turning cannot be overestimated.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a trailer embodying my invention.

Figure 2 is a side elevation of the trailer partly in section, showing the actuating mechanism of the supporting leg, and in dotted lines the leg as it would appear raised for transit.

Figure 3 is a diagrammatic elevation of the tractor-trailer combination.

Figure 4 is an end elevation with parts broken away, showing the channel in the flared throat of the skid casting to receive the guide wedge of the fifth wheel carried by the tractor.

Figure 5 is a fragmentary detail of the clutch showing the squared ends of the divided longitudinal shaft on which it is mounted.

Figure 9 is a fragmentary elevation with parts in section of the travelling head and a fragment of the divided longitudinal rotatable shaft at the forward end of the trailer, showing the fifth wheel member carried by the tractor locked to the travelling head of the trailer, preparatory to effecting a locking relation between the tractor and trailer.

Figure 10 is a cross-sectional view through the longitudinal helical shaft, the travelling head and interposed driving balls providing a rolling driving connection between the head and the longitudinal helical shaft, taken on or about line X—X of Figure 9.

Figure 11 is an end elevation of the travelling head, showing the helical shaft in cross-section.

Figure 12 is a fragmentary plan view of a detail showing means connected with the brake control-levers for automatically releasing the spring set brakes, immediately following the raising of the supporting leg carried by the trailer.

Figure 13 is a side elevation of the device appearing in the preceding view and the screw-threaded extension of the longitudinal helical shaft on which it is mounted, also the depending lug to which the brake control lever is connected and a fragment of the spring for automatically setting the brake.

Figure 6:
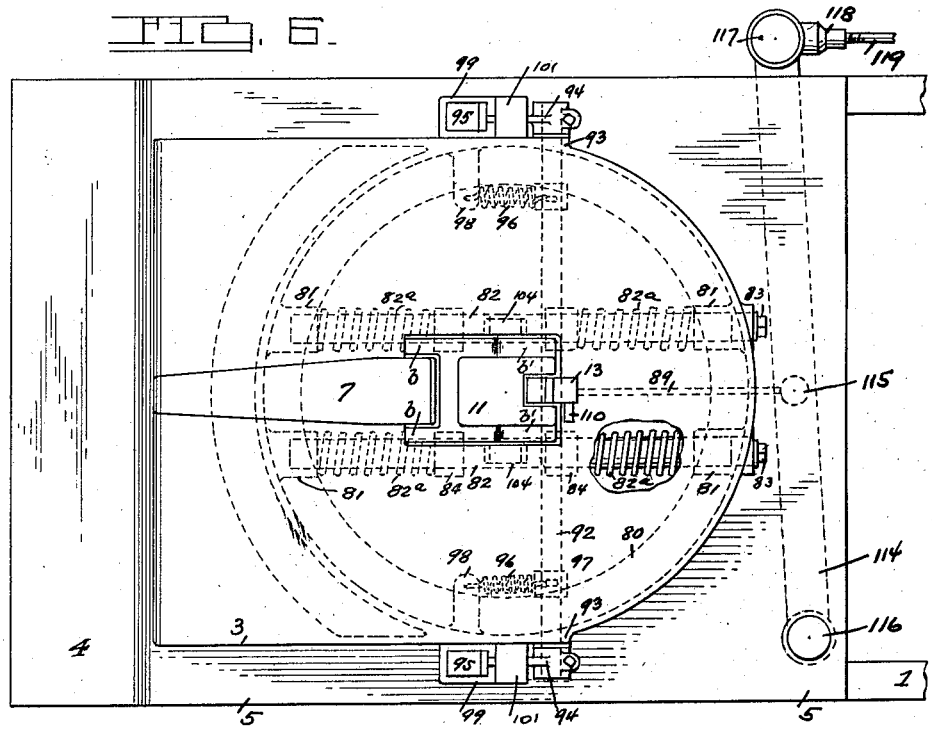
Figure 6 is a plan view of the lower fifth wheel member attached to the plate of the tractor.

Referring now to the reference numerals indicating the several parts:

Tractor 1 is provided with a fifth wheel 3, which has an inclined skid face registering with the inclined face of the platform 5, so that it can be backed under trailer 2, in order that the rollers 6 of the trailer may ascend the skid 4 and inclined face of fifth wheel 3.

An upright pilot or guide wedge 7 on the face of the fifth wheel member 3, carried by the tractor, is adapted to enter the flared throat of the skid casting 8 at the front end of trailer, and is guided by the walls forming the channel 9, onto plates 10—10 on trailer, until the plates 10—10 come in contact with the curved apex of the fifth wheel.

It will be noted that the inclined pilot or guide wedge 7 tapers at its lower portion to allow angularity of coupling, but toward its upper end its sides become parallel and substantially the same width as the head 11.

This arrangement insures the proper alignment of the trailer by the pilot or wedge 7, so that the rear of head 11 cannot be struck by plates 10—10 in coupling.

When the tractor is backed into position under the trailer, the plates 10—10 slide upon the apex 3, and the head 11 of fifth wheel follows down channel 9 of the skid casting.

When the travelling rotator head 23 on trailer is reached, lock 13 on fifth wheel (which is depressed) jumps into opening 14 of head 23;—the rear face of head 11 contacting with shoulder 15, see Figure 9.

The trailer is provided with a longitudinal rotatable shaft 16 which actuates a supporting element 17. This shaft is journaled in bearings 18—19—20 attached to frame of trailer and is composed of two sections having a helix 21 at the front end and a helix 22 at the rear end, over which respectively travel heads 23—24.

Projecting from the front end of helix 21 is a shaft 25 (see Figures 1 and 2) which rotates and slides in bearing 18. At its rear end is a similar shaft 26, which also rotates and slides in bearing 19, and has a squared end fitted and pinned to spiral clutch casting 27. This section of clutch (27) supports the squared end of shaft 16 and is so arranged that it can slide on it for a short distance against spring 28,—abutting against collar 29 pinned to shaft 16. Clutch segment 19ª,— which may be integral with bearing 19, is rigidly attached to trailer frame.

The rear helix 22 has a projecting shaft journaled in bearing 20 and mounted on the shaft is a collar 30 (see Figure 1) preventing any longitudinal movement.

Travelling head 24 has downwardly extending ears (see Figure 2) to which are pivoted link bars 35 connected with the channel side members 39—39 of supporting leg frame. At the upper end of these members are riveted castings 40—40 pivotally and slidably mounted in guide castings 41—41 attached to the main frame of the trailer. At the lower end are riveted the bearing castings 42—42 through which extends the axle 43. At the ends of this axle are attached the wheels 44—44.

To the front cross member 45 of trailer is attached a skid casting 8 having a central flared throat to receive head 11. Spaced apart and journaled in lugs 46—46 are elevating wheels 6—6.

On the under side of the frame are attached two heavy plates 10—10 spaced apart along the longitudinal axis so that they form a guide way for head 11. Supporting these plates are two longitudinal channel members 47—47.

Two Z-shaped members 48—48 extending longitudnally, are welded to the upper face of plates 10—10, and at the front end of the trailer across these Z-shaped members is bolted a bearing casting 18.

The trailer is equipped with a brake mechanism for coupling and uncoupling operations.

Projecting from the collar 30 at the end of the divided longitudinal helical shaft is a shaft 200 journaled in a bearing 201 secured to cross-member 202 of trailer frame.

The shaft 200 has a screw-thread formation for a portion of its length on which is mounted a travelling yoke 204 from which project a pair of pins 204ª spaced from each side of the shaft and secured to ears 203ª, projecting from a collar 203, (having a depending lug 203ᵇ) loosely sleeved upon the shaft. Mounted upon shaft 200 is an expansion spring 205, bearing at one end against the collar 203 and at the other end against the collar 206 secured to the shaft.

Brake rod 60 at its forward end is fitted with a handle 72 extending through an opening 73 in the front cross member 45. This handle has an upstanding pin which acts as a lock when pulled through opening and given a slight turn with handle, see Figure 4.

The brake rod 60 extends rearwardly to yoke end 61 pivoted to lever 62 in turn pivoted to the lug projecting downwardly from collar 203, loosely sleeved upon the shaft. Rocker shaft 63 extends across trailer through bearings in sub-frame 64—64. At each end are levers 65—65 carrying yoke ends 66—66 with threaded brake rods 67—67. These rods are yoked to the levers 68—68 attached to the usual brake mechanism 69—69.

The tractor member of fifth wheel 3 bears on plate or platform 5 (see Figures 6 and 7) and is horizontally turnable and slidable on same. It consists of a casting having a circular ring 80 at its base and four lugs 81—81, 81—81, spaced apart at opposite edges of circumference, bored to hold the draft bars 82—82.

On draft bars 82—82 are expanded coil springs 82ª—82ª. These bars are held in position by threaded taper plugs 83—83. Draft bars 82 are slidable through lugs 84—84, 84—84, which project upwardly from a ring plate 85. This plate is held in turnable contact with platform 5 by the annular ring 86 which projects through and bears on platform 5. Upper and lower lips on 86 prevent upward displacement.

A flanged pulley wheel 87 is carried by a horizontal shaft 88 journaled in lugs on inside wall of ring 86 and so arranged that the cable 89 remains in a central position without regard to position of trailer to tractor. One end of this cable is attached to lug 90 of lever 91 which is keyed to rocker lock shaft 92.

Shaft 92 extends across the inside of 3 and through bosses 93—93 on the outside.

At each end is keyed a lever 94—94 which actuates the main locks 95—95.

Suspended from 92 and clamped to it are two spring 96—96 actuated levers 97—97 for keeping locks 95—95 in an engaging position. These springs are hooked in holes bored in ends of levers 97—97 and lugs 98—98.

Locks 95—95 slide in housings 99—99 cast on 3—see Figure 6. They are slotted to accommodate ends of levers 94—94 which work on cross pins 100—100.

Figure 7:
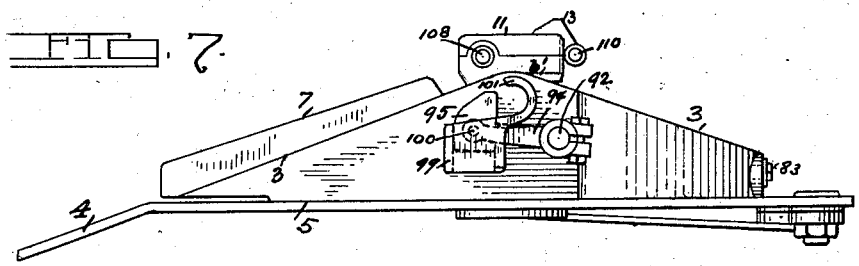
Figure 7 is a side elevation of the portion of the fifth-wheel member attached to the tractor.

Arc-shape stops 101—101 are provided to seat lock pins 102—102 riveted to frame of trailer, see Figures 6 and 7.

Figure 8:
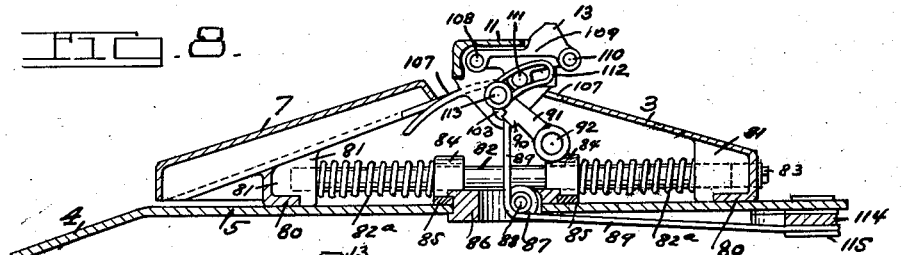
Figure 8 is a longitudinal vertical sectional view of the portion of the fifth wheel member attached to the tractor, showing the draft mechanism and lock controlling device.
Figure 14:
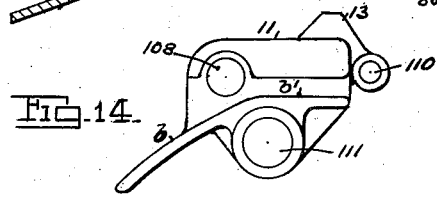
Figure 14 is a side elevation of the rocking head.

Rocking head 11 is a hollow casting projecting upwardly from apex of 3 and pivotally attached to it by pins 103—103 journaled in bosses 104—104—see Figures 6—8. A portion of the center of the apex of 3 is cut away at 107 to allow for rocking the head 11.

The rocking head 11 in the present invention is provided with improved means for automatically aligning the head in parallel relation with the trailer during the complete coupling and uncoupling operation.

This result is obtained by means of projecting edges $b$—$b$, extending from the lower edges and sides of the rocking head. The rearwardly extending portions of the edges are forked to clear the guide wedge or pilot 7 and are inclined to permanently conform to the inclined face of the fifth wheel member 3.

It should be noted that the inclined edges are slightly below the face of the fifth wheel member and therefore do not act as skid members.

The forward edges $b^1$—$b^1$ are parallel to the top of rocking head 11 and are the same height as the apex of the fifth wheel member.

On the inside of 11 pivoted on pin 108 is a lock lever 109, a wedged shaped portion 13 of which projects upwardly through a slot in its forward end for engagement with head 23 (see Figure 9). Below this and projecting laterally is a stop lug 110 which rides over plate 10 after coupling and prevents lock tripping in transit.

Through the lower web of this lever projects a pin 111 (see Figure 8) around which slides the link 112. This link is pivotedly pinned at 113 to end of lever 91.

Cables 89 is attached to lever 114 at 115;—see Figures 6—8. Lever 114 is pivoted by pin 116 to plate 5 and at its opposite end the lever is pivoted at 117 to a yoke end 118 threaded to a rod 119, which extends to a lever mounted in the tractor cab.

Having indicated the various parts by reference characters, I will now proceed with a description of the operation of the device which first consists in backing the rear end of tractor under the front end of the trailer whereupon the elevating wheels 6 come in contact with the skids 4 and raise the supports 17 from the ground bringing the throat of the skid casting 8 in position to receive the tractor, thereby limiting any turning movement of the fifth wheel member. The elevating wheels 6 continue up the inclined face of the fifth wheel 3 until the apex is passed, the plates 10—10 coming into contact with said apex. From this point the plates 10—10 slide upon the apex of the lower fifth wheel element to the completion of the leg lifting operation and final coupling;—the apex serving as a rocking surface while the vehicle is in transit.

The head 11 is guided between the plates 10—10 and members 48—48 to coupling relation with the head 23 on trailer. Projection 13 on lever 109, now springs into opening 14 of head 23 and simultaneously the rear face of 11 contacts with the lug 15 and forces it rearwardly.

When the head 11 enters the throat 9 of the skid casting 8, the proper angle will be maintained by the faces $b$—$b$ striking plates 10—10. When plates 10—10 ride over faces $b^1$—$b^1$ the head 11 will always be in parallel relation with the plates.

The helix 21 cannot rotate until the clutch 27—19$^a$ is disengaged, this arrangement is desirable to prevent the forwardly projecting supporting leg 17 from swinging backward into a dangerous position when the front end of the trailer is lifted by the tractor. It also insures a coupling of 11 to 23 being made before leg is raised.

Shafts 25—26 slide in their bearings 18 and 19. The segment 27 of the clutch is pinned to shaft 26 and is slidable on square end of 16 against the expanded coil spring 28. Thus the backing of the tractor disengages 27 from the rigidly attached clutch segment 19$^a$, allowing the head 23 to rotate helix 21 and shaft 16. This motion is transmitted to helix 22 which is in mesh with head 24, forcing head 24 backward, lifting the supporting leg 17 into a non-supporting position.

The lock pins 102—102 depress the locks 95—95 as the tractor is backed into position and are thereby held locked when the pins contact with pockets 101—101—see Figures 6—7—9.

The tractor and trailer are now coupled together and the unit is ready for transit.

To uncouple, the lever A in the cab is pulled. This motion is transmited by rod 119 to lever 114 and cable 89 which is attached to lever 91,—see Figure 7. As lever 91 clamped and keyed to rock shaft 92—see Figure 7—the locks 95—95 are depressed by levers 94—94 keyed to same shaft. The link 112 allows this motion without exerting any pull on pin 111 of lever 109. Also lug 110 prevents any release of lever 109 by contact with edge of plate 10 until the end of the leg lowering stroke is reached.

A forward motion of the tractor will now lower the leg 17.

At the end of the stroke a further pull of cab lever A, will depress the lock lever 109 and lock 13 will leave pocket 14, lug 110 passes through opening cut in 10, (see Figure 9) the plates 10—10 slide along apex of 3, wheels 6—6 then roll down inclined face of 3 and off of skid 4.

The tractor is now disconnected. The brakes are set when lug 53 breaks contact with end of bar 49; it being noted however that the final operation of uncoupling is attained through a manual release.

Having described my invention what I claim is:

1. In a tractor-trailer combination wherein a trailer is adapted to be coupled to a tractor; supporting means for the forward end of the trailer adapted to be moved into or out of action; a divided longitudinally disposed shaft provided with helical grooves and journaled in the trailer with one portion of said shaft slidable in its bearings;—a clutch adapted to secure said shaft against rotation; means operatively connecting said trailer supporting means with one section of said rotatable shaft, whereby the trailer supporting means may be brought into or out of action; a travelling head loosely sleeved upon the longitudinal shaft having a plurality of ball retaining pockets; a plurality of balls lodged partially in the helical grooves of the shaft and partially in the ball retaining pockets of the travelling head; means carried by the tractor for engaging the travelling head, whereby the head may be reciprocated upon alternately backing the tractor into the trailer, or driving the tractor in a forward direction to cause the balls to revolve that they may actuate the shaft; and means actuated by the rotation of the shaft for raising and lowering the supporting leg.

2. In a tractor-trailer combination wherein a trailer is adapted to be coupled to a tractor; a swinging supporting leg for the trailer, a longitudinally disposed shaft having a helical groove journaled on the trailer, formed in two sections rotatably connected together, with one portion slidable in its bearings; means for securing the shaft against rotation; a pair of travelling heads having a plurality of ball retaining pockets respectively mounted on each section of the shaft, a plurality of balls partially lodged in the helical grooves of each section of the shaft and partially in the ball-retaining pockets of the respective travelling heads, means for operatively connecting the swinging supporting leg with one of the travelling heads and means carried by the tractor adapted to engage the other travelling head when backed into the trailer, whereby the sections of the shaft are released from their non-rotatable clutched relation, that the shaft may be rotated to raise or lower the supporting leg.

3. A structure as specified in claim 2 in combination with a normally set spring actuated brake mechanism, a screw shaft projecting rearwardly from the end of the divided longitudinally disposed shaft; a yoke member tapped to receive the screw shaft, a collar loosely sleeved upon the screw shaft secured to the yoke, an expansion spring adapted to bear against the collar, a rocking lever pivoted to said collar and connected with the normally set spring actuated brake mechanism, whereby upon the rotation of the screw shaft due to the operation of the longitudinal shaft said yoke forced to travel along the screw shaft actuates the loosely sleeved collar, thereby rocking the lever pivoted to the collar and connected with the brake mechanism, to release the brake.

4. In a tractor-trailer combination of the character described, wherein the forward end of the trailer is adapted to be coupled to the rear end of the tractor in superposed relation to the latter; a fifth wheel adapted to effect the coupling relation, comprising lower and upper members respectively attached to the tractor and to the trailer, said lower member embodying permanent, opposing upwardly inclined surfaces; a pilot member extending upwardly from one of the inclined surfaces of the lower fifth-wheel member; a rocking coupling member projecting above the apex of said opposing upwardly inclined surfaces of the lower member, including means for automatically aligning the rocking member in parallel relation with the trailer, during coupling and uncoupling operations, said aligning means consisting of lateral extensions of the side walls of the rocking head with rearwardly forked portions, adapted to clear said pilot member, said forked portions being inclined downwardly to conform to the inclined face of the lower fifth-wheel member and below the face of the latter, to avoid serving as skid members.

5. A structure as specified in claim 4 in which the edges of the forward portion of the lateral extensions of the rocking head are parallel and on a plane with the apex of the upwardly inclined surfaces of the lower fifth-wheel member.

6. A structure as specified in claim 4 in which the pilot member extending upwardly from the inclined surface of the lower fifth wheel member is tapered from its lower end upwardly for a portion of its length, the sides of the pilot member being from thereon parallel and of the same width as the rocking coupling member, whereby a proper alignment of the trailer is insured in order that the rear of the rocking coupling head may not be struck by the plates 10—10 in effecting the coupling relation.

7. In a tractor-trailer, the combination wherein a trailer is adapted to be coupled to a tractor, a movable supporting leg for the trailer, a longitudinally disposed shaft having helical grooves at the forward and rearward ends thereof and journalled in the trailer, a forwardly and rearwardly disposed head longitudinally movable upon the said shaft, each having a plurality of ball retaining pockets, a plurality of balls partially lodged in the grooves of the longitudinal shaft and partially in the ball retaining pockets of the respective heads, whereby the heads may reciprocate upon the shaft without sliding, means carried by the tractor for engaging the forward head for reciprocating the said forward head by a backward and forward movement of the tractor in relation to the trailer, and means connecting the rearwardly disposed longitudinally movable head with the movable supporting leg of the trailer, whereby upon rotation of the longitudinal shaft the leg may be shifted from a supporting position to a non-supporting position, and vice versa, the helical grooves at the forward end of the longitudinal shaft being of lower pitch than the helical grooves at the rear end of the shaft, whereby a relatively short movement of the tractor in relation to the trailer will cause the supporting leg to move rapidly rearwardly and upwardly or vice versa.

In testimony whereof I sign this specification.

CHARLES H. LAND.